(12) United States Patent
Kitahara et al.

(10) Patent No.: US 8,644,968 B2
(45) Date of Patent: Feb. 4, 2014

(54) CONTENT REPRODUCTION APPARATUS, STATUS BAR DISPLAY METHOD, AND STATUS BAR DISPLAY PROGRAM

(75) Inventors: Yoko Kitahara, Tokyo (JP); Tatsuya Yamazaki, Kanagawa (JP); Ryuichiro Noto, Chiba (JP)

(73) Assignee: Sony Corporation, Tokyo (JP)

( * ) Notice: Subject to any disclaimer, the term of this patent is extended or adjusted under 35 U.S.C. 154(b) by 1069 days.

(21) Appl. No.: 12/428,756

(22) Filed: Apr. 23, 2009

(65) Prior Publication Data
US 2009/0281645 A1 Nov. 12, 2009

(30) Foreign Application Priority Data
May 12, 2008 (JP) ................. 2008-124953

(51) Int. Cl.
*G06F 17/00* (2006.01)
(52) U.S. Cl.
USPC ............. 700/94; 715/716; 715/720; 715/727
(58) Field of Classification Search
USPC ............... 715/720, 716, 727; 700/94
See application file for complete search history.

(56) References Cited

U.S. PATENT DOCUMENTS

| | | | | |
|---|---|---|---|---|
| 5,682,511 | A * | 10/1997 | Sposato et al. ............. | 715/716 |
| 6,987,221 | B2 * | 1/2006 | Platt .............................. | 84/601 |
| 7,765,491 | B1 * | 7/2010 | Cotterill ........................ | 715/833 |
| 2002/0057287 | A1 * | 5/2002 | Crow et al. ................... | 345/716 |
| 2005/0076008 | A1 * | 4/2005 | Kudou .............................. | 707/3 |
| 2006/0235550 | A1 * | 10/2006 | Csicsatka et al. ............... | 700/94 |
| 2008/0165141 | A1 * | 7/2008 | Christie ........................ | 345/173 |
| 2009/0005891 | A1 * | 1/2009 | Batson et al. ................... | 700/94 |
| 2010/0232626 | A1 * | 9/2010 | Paquier et al. ................ | 381/119 |

FOREIGN PATENT DOCUMENTS

| | | |
|---|---|---|
| JP | 2000-148164 | 5/2000 |
| JP | 2004-48546 | 2/2004 |
| JP | 2004-234807 | 8/2004 |
| JP | 2007-80304 | 3/2007 |
| JP | 2007-133921 | 5/2007 |
| JP | 2007-142785 | 6/2007 |
| JP | 2007-200373 | 8/2007 |

* cited by examiner

*Primary Examiner* — Paul McCord
(74) *Attorney, Agent, or Firm* — Oblon, Spivak, McClelland, Maier & Neustadt, L.L.P.

(57) ABSTRACT

A content reproduction apparatus includes: a partial reproduction unit for partially reproducing only a predetermined partial reproduction range in an entire reproduction range of contents before switching to next contents to partially reproduce only a predetermined partial reproduction range in an entire reproduction range of the next contents; a creation unit for creating a status bar by superimposing a partial reproduction range bar indicating the partial reproduction range on an entire reproduction range bar indicating the entire reproduction range; a display unit for displaying a reproduction screen when the partial reproduction is performed by the partial reproduction unit; and a control unit for displaying the status bar as superimposed on the reproduction screen.

10 Claims, 14 Drawing Sheets

CONTENT REPRODUCTION APPARATUS, STATUS BAR DISPLAY METHOD, AND STATUS BAR DISPLAY PROGRAM

BACKGROUND OF THE INVENTION

1. Field of the Invention

The present invention relates to a content reproduction apparatus, a status bar display method, and a status bar display program, and is suitable applicable to, for example, a vehicle audio apparatus to be mounted on a vehicle.

2. Description of the Related Art

There has been a known audio apparatus that starts reproducing each of selected contents from various positions each time the selection is changed, thereby providing fresh tastes and interests as compared to when reproducing the contents from the beginning every time the selection is changed (for example, see Jpn. Pat. Appln. Laid-Open Publication No. 2007-200373).

SUMMARY OF THE INVENTION

While the audio apparatus of such configuration can reproduce contents from various positions, it is not possible to make the user understand what part is being partially reproduced with respect to the entire range of the contents. There has thus been the problem that it is not possible for the user himself/herself to determine whether or not he/she is listening to a user-desired partial reproduction range.

The present invention has been achieved in view of the foregoing, and is to propose a content reproduction apparatus, a status bar display method, and a status bar display program which allow intuitive recognition of the position of the partial reproduction range with respect to the entire reproduction range of contents.

To solve the foregoing problem, an aspect of the present invention includes: partially reproducing only a predetermined partial reproduction range in an entire reproduction range of contents before switching to next contents to partially reproduce only a predetermined partial reproduction range in an entire reproduction range of the next contents; creating a status bar by superimposing a partial reproduction range bar indicating the partial reproduction range on an entire reproduction range bar indicating the entire reproduction range; displaying a reproduction screen when the partial reproduction is performed; and displaying a status bar as superimposed on the reproduction screen.

This makes it possible for the user to visually observe the position of the partial reproduction range bar with respect to the entire area bar of the status bar, so that the user can intuitively understand what part of the contents is being partially reproduced when contents are switched to repeat the partial processing.

According to the present invention, it is possible for the user to visually observe the position of the partial reproduction range bar with respect to the entire area bar on the status bar, so that the user can intuitively understand what part of the contents is being partially reproduced when contents are switched to repeat the partial reproduction. This makes it possible to achieve a content reproduction apparatus, a status bar display method, and a status bar display program which allow intuitive recognition of the position of the partial reproduction range with respect to the entire reproduction range of contents.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Hereinafter, an embodiment of the present invention will be described in detail with reference to the drawings.

(1) Overall Configuration of Vehicle Audio Apparatus

Figure 1A:
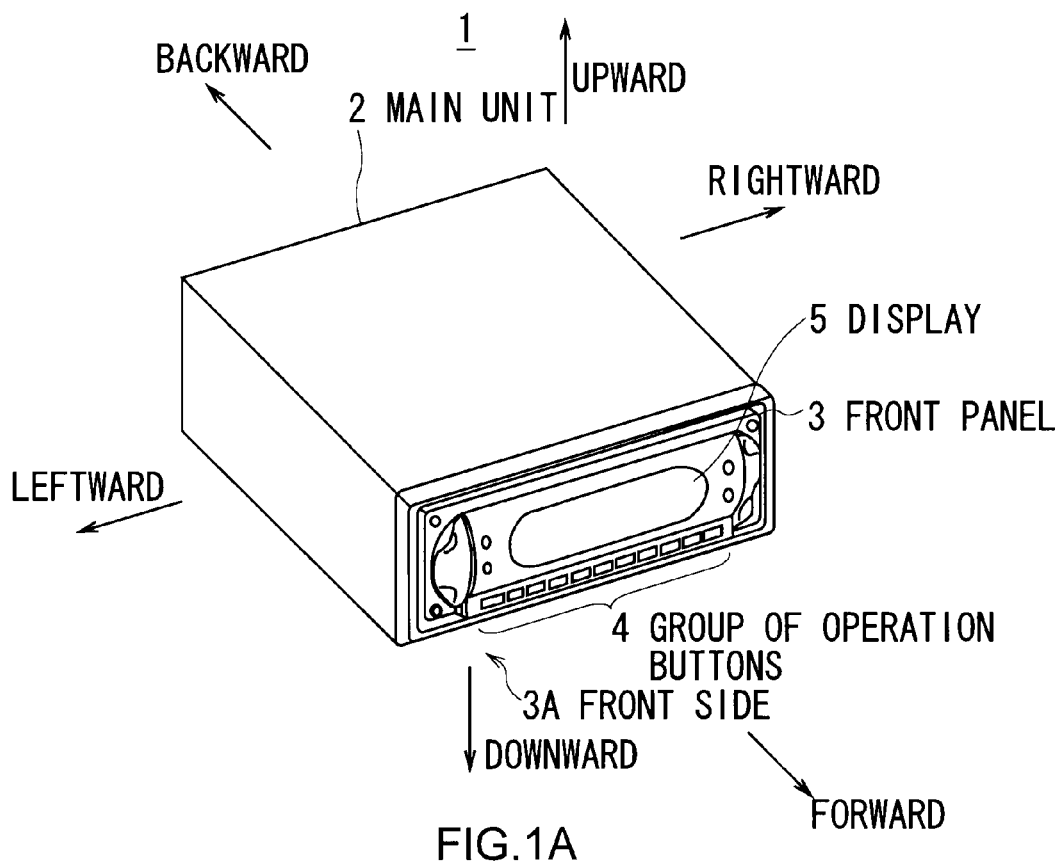
FIGS. 1A and 1B are schematic perspective views showing the overall configuration of a vehicle audio apparatus.
Figure 1B:
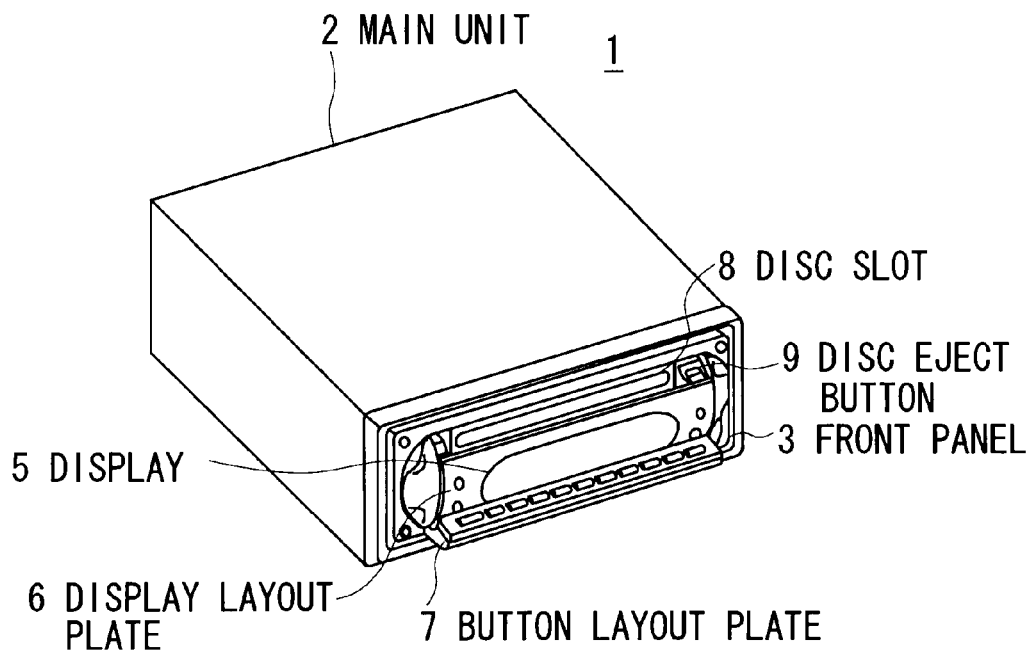

FIGS. 1A and 1B show a vehicle audio apparatus according to the embodiment of the present invention as a whole. The vehicle audio apparatus 1 has a front panel 3 on the front side of its main unit 2, and receives radio broadcasting and performs reproduction processing on a compact disc (CD) medium, digital versatile disc (DVD) medium, or the like according to user operations.

The vehicle audio apparatus 1 provides the radio sound of the radio broadcasting and the reproduced sound of the CD medium or DVD medium so as to be heard by the user through a vehicle's speaker (not shown) that is connected with the main unit 2.

When the vehicle audio apparatus 1 is mounted on a now-shown vehicle, the vehicle audio apparatus 1 is supposed to be attached so that a major portion of the main unit 2 is embedded in a dashboard with only the front panel 3 exposed to outside the dashboard.

In fact, the vehicle audio apparatus 1 is in conformity with a so-called Deutsche Industrie Normen (DIN) size. The main unit 2 and the front panel 3 are formed to a width of approximately 178 mm and a height of approximately 50 mm.

Note that the vehicle audio apparatus 1 is not limited to such a 1-DIN size, but may have a 2-DIN size as well as various other sizes.

The front panel 3 has a group of operation buttons 4 for accepting user operations and a display 5 for providing various types of information to the user on its front side 3A, and thus functions as a so-called user interface. The display 5 is composed of a liquid crystal display (LCD), organic electroluminescence (EL) display, vacuum fluorescent display (VFD), or the like.

The front panel 3 (FIG. 1B) includes a display layout board 6 on which the display 5 is arranged and a button layout board 7 on which some of the group of operation buttons 4 are arranged. The display layout board 6 is configured to slide downward in whole, and the button layout board 7 arranged below the display layout board 6 tilts to slide and protrude forward accordingly.

The vehicle audio apparatus 1 has a disc slot 8 for a CD medium, DVD medium, or the like to be inserted and ejected through, and a disc eject button 9 for ejecting the CD medium, DVD medium, or the like. The disc slot 8 and the disc eject button 9 are arranged in an area of the front panel 3 to be exposed when the display layout board 6 is slid downward.

The vehicle audio apparatus 1 has a built-in hard disc drive (not shown) in the main unit 2, and can reproduce a large amount of music contents and video contents stored in the hard disc of the hard disc drive and output the resultant from the display 5 and/or the speaker 27.

Incidentally, the vehicle audio apparatus 1 is configured so that the main unit 2 and the front panel 3 can be electrically and mechanically connected to and disconnected from each other through a connector (not shown). In terms of anti-theft measures and the like, the front panel 3 can thus be detached from the main unit 2 when the vehicle is parked.

(2) Circuit Configuration of Vehicle Audio Apparatus

Next, description will be given of the circuit configuration of the main unit 2 and the front panel 3 which constitute the vehicle audio apparatus 1. In fact, the vehicle audio apparatus 1 runs on a power supply from a not-shown vehicle battery.

Figure 2:
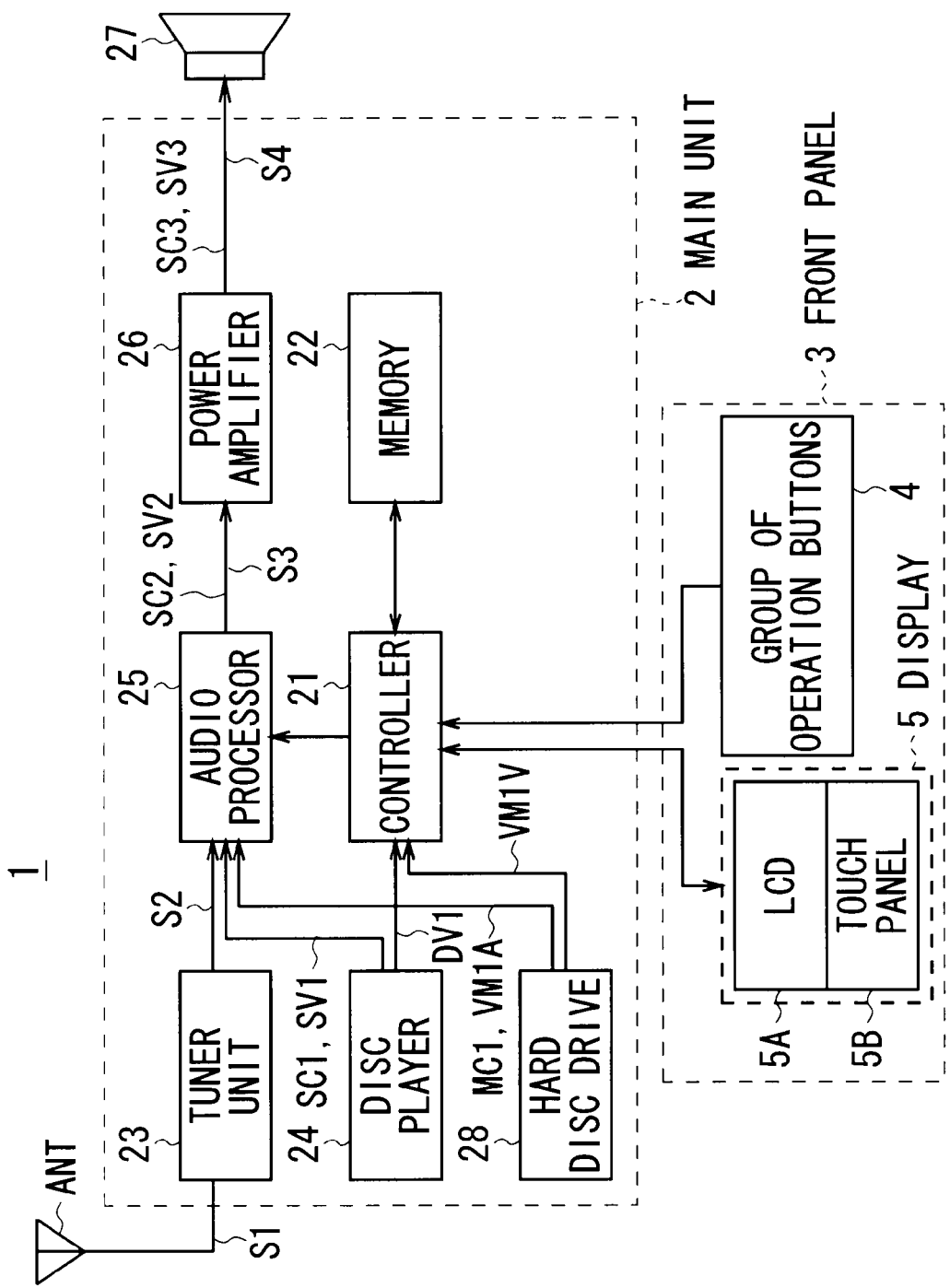
FIG. 2 is a schematic block diagram showing the circuit configuration of the vehicle audio apparatus.

As shown in FIG. 2, the main unit 2 of the vehicle audio apparatus 1 has a controller 21 of central processing unit (CPU) configuration. The controller 21 performs centralized control on the entire apparatus according to a basic program that the controller 21 reads from a read only memory (ROM) and runs on a random access memory (RAM).

The controller 21 of the main unit 21 also receives radio broadcasting and performs the reproduction, output, and the like of a CD medium or DVD medium according to various application programs that the controller 21 reads from the ROM and runs on the RAM.

A memory 22 is a nonvolatile memory, and contains various types of setting data to be stored and retained before power-off. When power-on, the controller 21 of the main unit 2 can thus restore the state before the power-off based on the various types of setting data stored in the memory 22.

When the group of operation buttons 4 on the front panel 3 are depressed and operated by the user to select a radio reception mode, the controller 21 of the main unit 2 receives a radio broadcasting signal S1 received through an antenna ANT and sends it to a tuner unit 23.

The tuner unit 23 extracts the broadcasting signal of a channel selected by the user from the radio broadcasting signal S1, converts the broadcasting signal into an audio signal S2 through the application of demodulation processing, decoding processing, and the like, and sends the audio signal S2 to an audio processor 25.

The audio processor 25 applies audio adjustment processing such as equalizer processing and volume adjustment processing to the audio signal S2, and sends the resulting audio signal S3 to a power amplifier 26.

The power amplifier 26 amplifies the audio signal S3 to a predetermined level, and sends the resulting audio signal S4 to the speaker 27, thereby outputting radio sound according to the audio signal S4 from the speaker 27.

Now, if the group of operation buttons 4 on the front panel 3 are depressed and operated to select a disc reproduction mode (CD reproduction mode or DVD reproduction mode), the controller 21 of the control unit 2 makes a disc player 24 play the CD medium or DVD medium.

The controller 21 of the main unit 2 then supplies the audio processor 25 with music contents SC1 that are obtained by playing the CD medium on the disc player 24 or music contents SV1 that are obtained by playing the DVD medium.

When the music contents SC1 or SV1 are supplied from the disc player 24, the audio processor 25 applies the foregoing audio adjustment processing to the music contents SC1 or SV1, and sends the resulting audio signal SC2 or SV2 to the power amplifier 26.

The power amplifier 26 amplifies the music signal SC2 or SV2 to a predetermined level, and sends the resulting music signal SC3 or SV3 to the speaker 27, thereby outputting reproduced CD sound or reproduced DVD sound according to the music signal SC3 or SV3 from the speaker 27.

When the DVD reproduction mode is selected and reproduced DVD video data DV1 is supplied from the disc player 24, the controller 21 of the main unit 2 outputs the reproduced DVD video data DV1 to an LCD 5A of the display 5 so that the reproduced DVD video is displayed on the LCD 5A.

Moreover, if the group of operation buttons 4 on the front panel 3 are depressed and operated by the user to select a hard disc reproduction mode, the controller 21 of the main unit 2 makes the hard disc drive 28 reproduce music contents MC1 or video contents VM1 stored in the hard disc.

When reproducing the music contents MC1, the controller 21 makes the reproduced sound corresponding to the music contents MC1 output from the speaker 27 through the audio processor 25 and the power amplifier 26 again.

When reproducing the video contents VM1, the controller 21 outputs reproduced video data VM1V to the LCD 5A of the display 5. For reproduced audio data VM1A, the controller 21 makes the reproduced sound corresponding to the reproduced audio data VM1A output from the speaker 27 through the audio processor 25 and the power amplifier 26 as with the music contents MC1.

Incidentally, when reproducing the CD medium in the CD reproduction mode and when reproducing the music contents MC1 in the hard disc reproduction mode, the controller 21 of the main unit 2 also displays various information such as a song title, artist name, elapsed reproduction time, and CD jacket photo pertaining to the reproduced piece of music on the LCD 5A of the display 5.

The front panel 3 is formed so that a touch panel 5B is laminated under the LCD 5A of the display 5. The touch panel 5B can accept commands corresponding to user's touch operations on the LCD 5A, and supply the commands to the controller 21 of the main unit 2.

Note that the controller 21 of the main unit 2 can not only accept user commands through touch operations on the touch panel 5B of the display 5 but also accept user commands through user's depressing operations on the group of operation buttons 4 to perform various types of processing according to the commands.

(3) Basic Principle of Automatic Climax Part Reproduction Processing

The vehicle audio apparatus 1 can select music contents stored in a CD medium or DVD medium that can be reproduced by the disc player 24 of the main unit 2 and music contents stored in the hard disc that can be reproduced by the hard disc drive 28 as target pieces to be reproduced, and output the results of reproduction from the speaker 27 in succession.

Since the vehicle audio apparatus 1 contains enormous amounts of music contents that can be reproduced just by the hard disc drive 28 alone, for example, it is often the case that the user himself/herself does not know exactly which music contents he/she would like to reproduce.

The vehicle audio apparatus 1 is then configured so that it can extract data that only corresponds to so-called "climax" parts of a plurality of pieces of music contents to be reproduced by the disc player 24 and the hard disc drive 28 of the main unit 2 (hereinafter, this data will be referred to as "climax part data"), and reproduce and output the pieces of climax part data in succession (hereinafter, referred to as automatic climax part reproduction processing).

Consequently, the vehicle audio apparatus 1 reproduces only the "climax" parts of the music contents by the automatic climax part reproduction processing, instead of reproducing an enormous number of pieces of music contents all the way through in succession. This makes it possible to determine whether or not the songs being played suit the user's taste in a short time easily.

Figure 3:
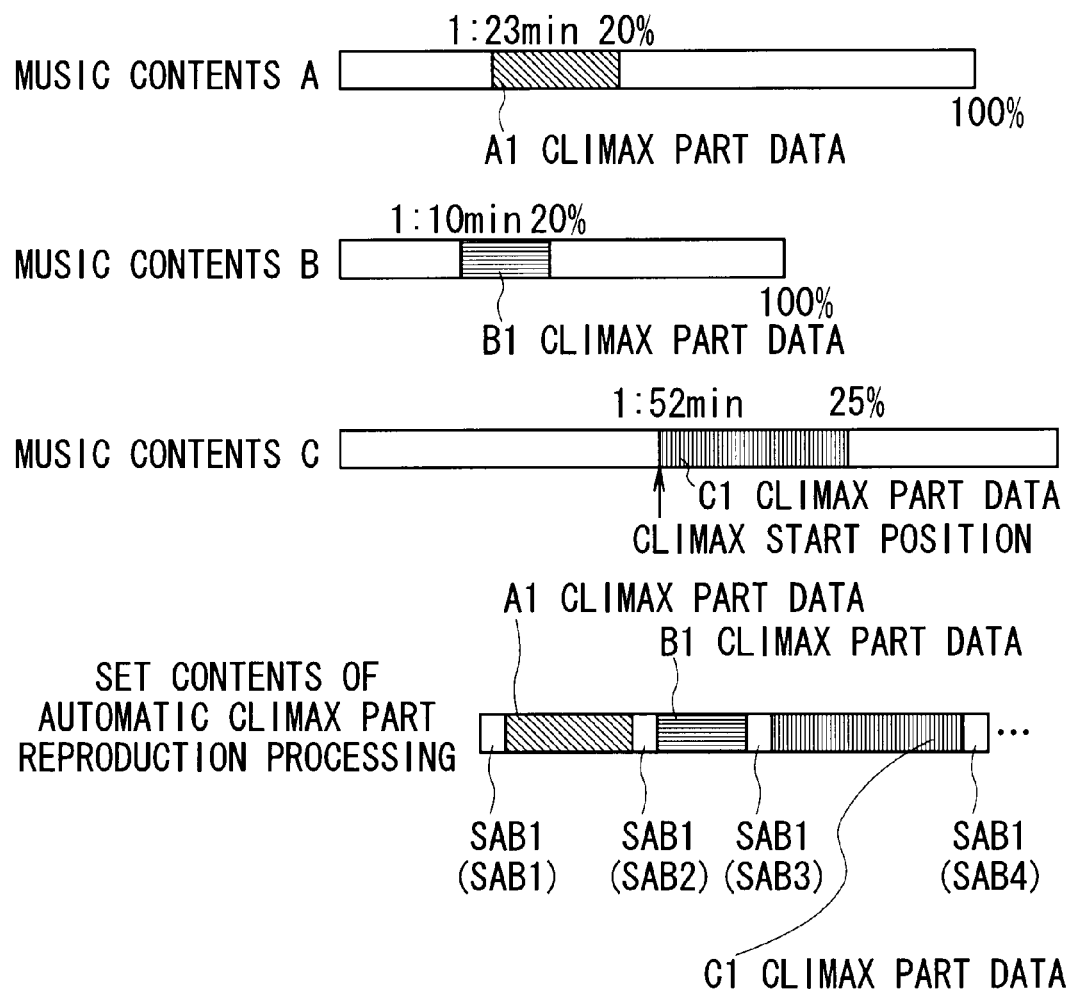
FIG. 3 is a schematic diagram for explaining automatic climax part reproduction processing.

In fact, suppose that a group of music contents, e.g., A, B, and C are selected as targets to be reproduced as shown in FIG. 3. For the music contents A, the vehicle audio apparatus 1 automatically detects the point in time when 1 minute and 23 seconds have elapsed since the start of reproduction as a climax start position, the point corresponding to where the sound level increases so sharply as to exceed a predetermined threshold in the entire contents. The vehicle audio apparatus 1 then sets 20% of the entire contents from the climax start position as climax part data A1.

For the music contents B, the vehicle audio apparatus 1 automatically detects the point in time when 1 minute and 10 seconds have elapsed since the start of reproduction as a climax start position, the point corresponding to where the sound level increases so sharply as to exceed a predetermined threshold in the entire contents. The vehicle audio apparatus 1 then sets 20% of the entire contents from the climax start position as climax part data B1.

For the music contents C, the vehicle audio apparatus 1 automatically detects the point in time when 1 minute and 52 seconds have elapsed since the start of reproduction as a climax start position, the point corresponding to where the sound level increases so sharply as to exceed a predetermined threshold in the entire contents. The vehicle audio apparatus 1 then sets 25% of the entire contents from the climax start position as climax part data C1.

The vehicle audio apparatus 1 then arranges the climax part data A1, the climax part data B1, and the climax part data C1 in order, with a predetermined climax switching sound effect SAB1 of, e.g., two seconds or so inserted into each break between the pieces of climax part data A1 to C1 as inserted contents. The vehicle audio apparatus 1 thereby sets the specific contents of the automatic climax part reproduction processing.

Consequently, according to the set contents of the automatic climax part reproduction processing, the vehicle audio apparatus 1 can reproduce and output the pieces of climax part data A1 to C1 in succession with "the climax switching sound effect SAB1" therebetween, like "the climax switching sound effect SAB1"→"the climax part data A1"→"the climax switching sound effect SAB1"→"the climax part data B1"→"the climax switching sound effect SAB1"→"the climax part data C1"→"the climax switching sound effect SAB1"→ . . . and so on.

Since the user can listen to the partial reproduced sounds of the climax part data A1 to C1 in order without any special operation, it is possible to encounter music contents unexpected to the user and discover music contents that the user himself/herself does not identify but potentially thinks would like to listen to.

This makes it possible for the user to find music contents that suit the user's taste in a short time from among a large number of pieces of music contents through the automatic climax part reproduction processing of the vehicle audio apparatus 1. The above is a major characteristic of the automatic climax part reproduction processing.

While the climax switching sound effect SAB1 of identical content is inserted into each break between the pieces of climax part data A1 to C1 as inserted contents, the inserted contents need not necessarily have the same content. Climax switching sound effects SAB1, SAB2, SAB3, SAB4, . . . of respective different types may be inserted as the inserted contents.

(4) Status Bar Display

Now, the vehicle audio apparatus 1 displays a status bar (to be described later) according to a status bar display program while performing the automatic climax part reproduction processing, for example, on the music contents A with a reproduction time of 4 minutes and 23 seconds. The status bar indicates which part in the entire reproduction range of the music content A is being partially reproduced as a "climax" part, or partial reproduction range.

Figure 4A:
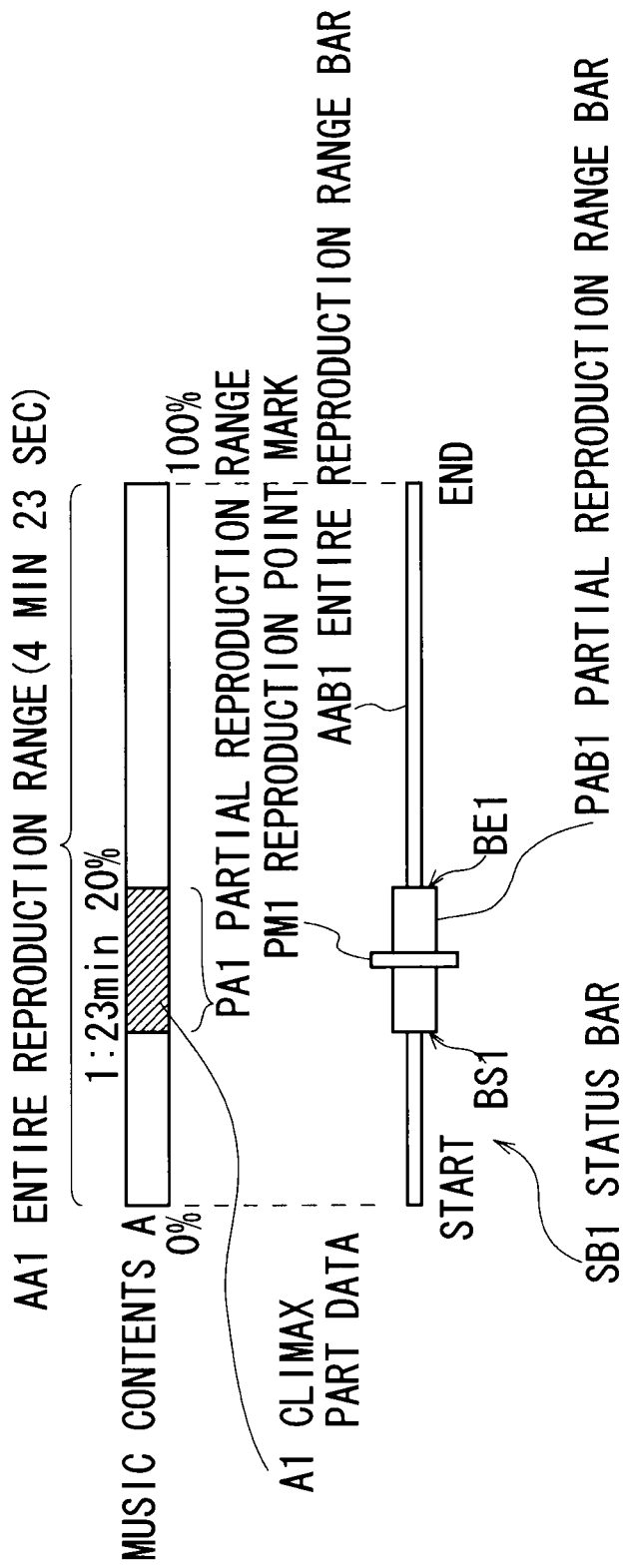
FIGS. 4A to 4C are schematic diagrams showing the configuration of a status bar.

In fact, as shown in FIG. 4A, the controller 21 of the main unit 2 of the vehicle audio apparatus 1 creates an entire reproduction range bar AAB1 which corresponds to the entire reproduction range (0% to 100%) AA1 of the music contents A. The entire reproduction range AA1 has a "START" which corresponds to the reproduction start time of 0 minutes 0 seconds, and an "END" which corresponds to the reproduction end time of, e.g., 4 minutes 23 seconds.

The controller 21 of the main unit 2 then creates a partial reproduction range bar PAB1 which corresponds to a partial reproduction range PA1 of the climax part data A1 equivalent to 20% of the entire contents from the point where 1 minute and 23 seconds have elapsed since the start of reproduction. The controller 21 superimposes the partial reproduction range bar PAB1 on the entire reproduction range bar AAB1 to create a status bar SB1.

Here, the controller 21 of the main unit 2 creates the partial reproduction range bar PAB1 so as to be thicker than the entire reproduction range bar AAB1. This makes it easier to visually recognize in what position the partial reproduction range bar PAB1 is located with respect to the entire reproduction range bar AAB1.

The controller 21 of the main unit 2 sets the left end of the partial reproduction range bar PAB1 as a partial reproduction start point BS1 (partial reproduction start time) and the right end of the partial reproduction range bar PAB1 as a partial reproduction end point BE1 (partial reproduction end time) according to the climax part data A1.

Note that the controller 21 of the main unit 2 can display a bar-shaped reproduction point mark PM1 as superimposed on the partial reproduction range bar PAB1. The reproduction point mark PM1 is to be moved and displayed according to the elapsed reproduction time of the partial reproduction range bar PAB1 on the status bar SB1.

Figure 4B:
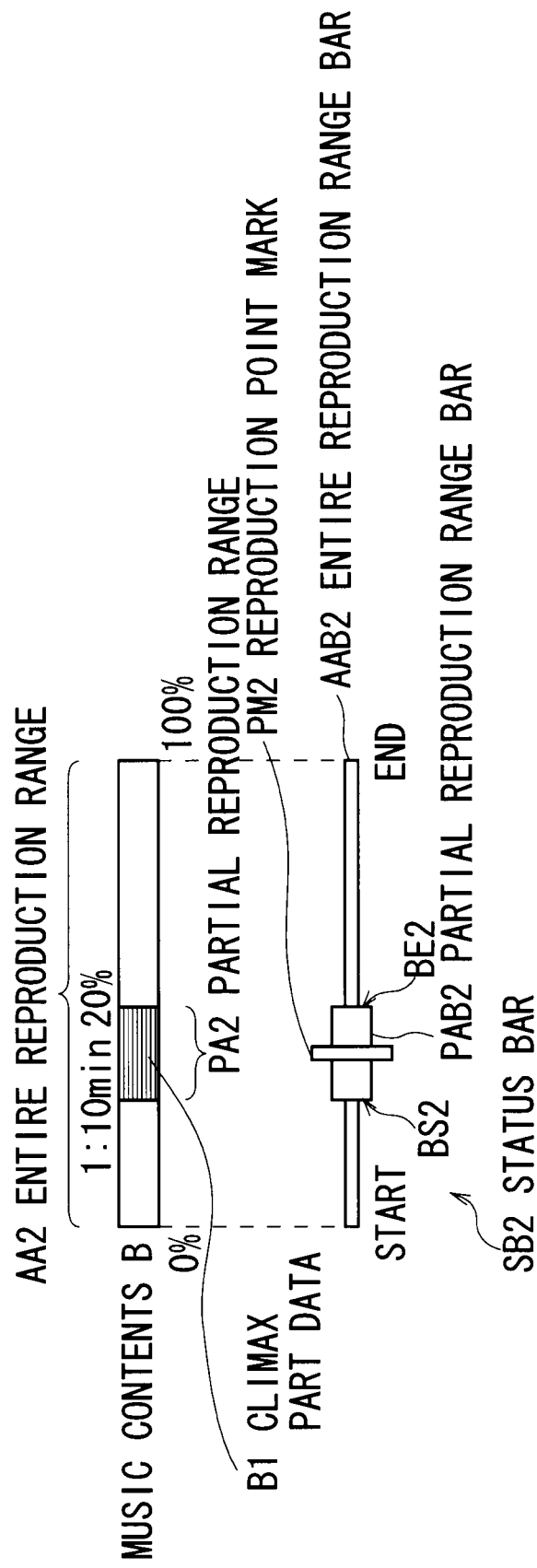

As shown in FIG. 4B, the controller 21 of the main unit 2 of the vehicle audio apparatus 1 creates an entire reproduction range bar AAB2 which is equivalent to the entire reproduction range (0% to 100%) AA2 of the music contents B.

The controller 21 of the main unit 2 then creates a partial reproduction range bar PAB2 which corresponds to a partial reproduction range PA2 of the climax part data B1 equivalent to 20% of the entire contents from the point where 1 minute and 10 seconds have elapsed since the start of reproduction. The controller 21 superimposes the partial reproduction range bar PAB2 on the entire reproduction range bar AAB2 to create a status bar SB2.

Again, the controller 21 of the main unit 2 can display a reproduction point mark PM2 as superimposed on the partial reproduction range bar PAB2. The reproduction point mark PM2 is to be moved and displayed according to the elapsed reproduction time of the partial reproduction range bar PAB2 on the status bar SB2.

The controller 21 of the main unit 2 also sets the left end of the partial reproduction range bar PAB2 as a partial reproduction start point BS2 (partial reproduction start time) and the right end of the partial reproduction range bar PAB2 as a partial reproduction end point BE2 (partial reproduction end time) according to the climax part data B1.

Figure 4C:
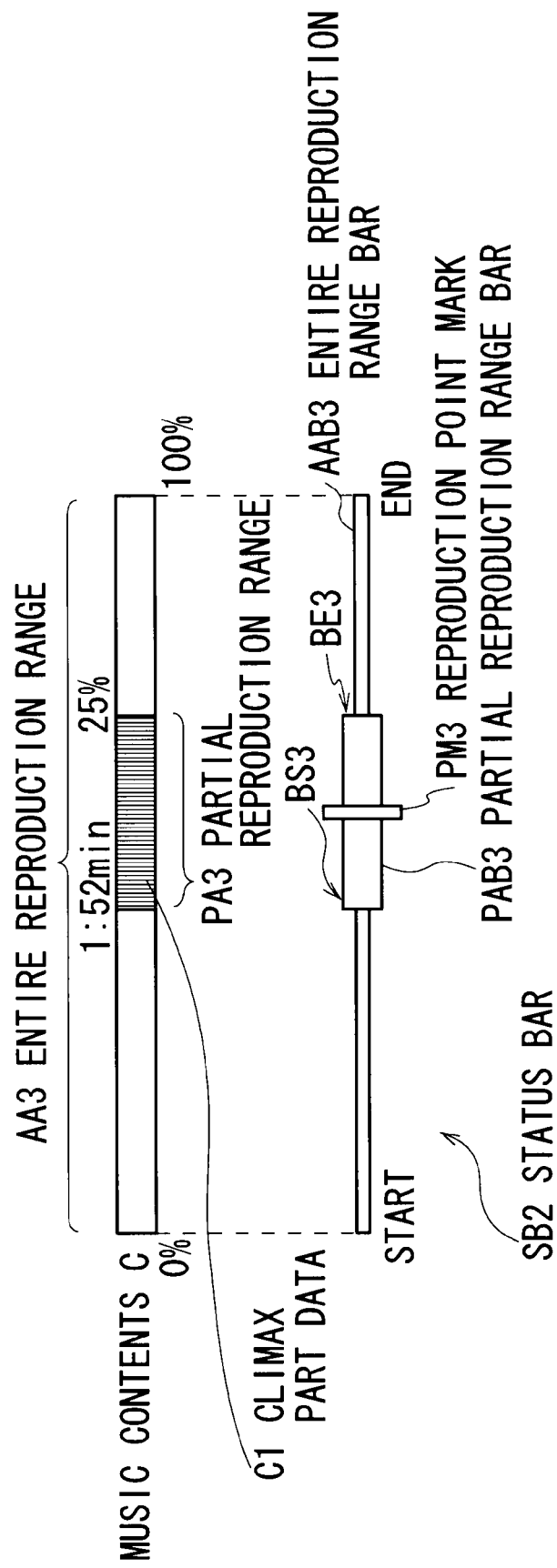

As shown in FIG. 4C, the controller 21 of the main unit 2 of the vehicle audio apparatus 1 further creates an entire reproduction range bar AAB3 which corresponds to the entire reproduction range (0% to 100%) AA3 of the music contents C.

The controller 21 of the main unit 2 then creates a partial reproduction range bar PAB3 which corresponds to a partial reproduction range PA3 of the climax part data C1 equivalent to 25% of the entire contents from the point where 1 minute and 52 seconds have elapsed since the start of reproduction. The controller 21 superimposes the partial reproduction range bar PAB3 on the entire reproduction range bar AAB3 to create a status bar SB3.

Again, the controller 21 of the main unit 2 can also display a reproduction point mark PM3 as superimposed on the partial reproduction range bar PAB3. The reproduction point mark PM3 is to be moved and displayed according to the elapsed reproduction time of the partial reproduction range bar PAB3 on the status bar SB3.

The controller 21 of the main unit 2 also sets the left end of the partial reproduction range bar PAB3 as a partial reproduction start point BS3 (partial reproduction start time) and the right end of the partial reproduction range bar PAB3 as a partial reproduction end point BE3 (partial reproduction end time) according to the climax part data C1.

Figure 5:
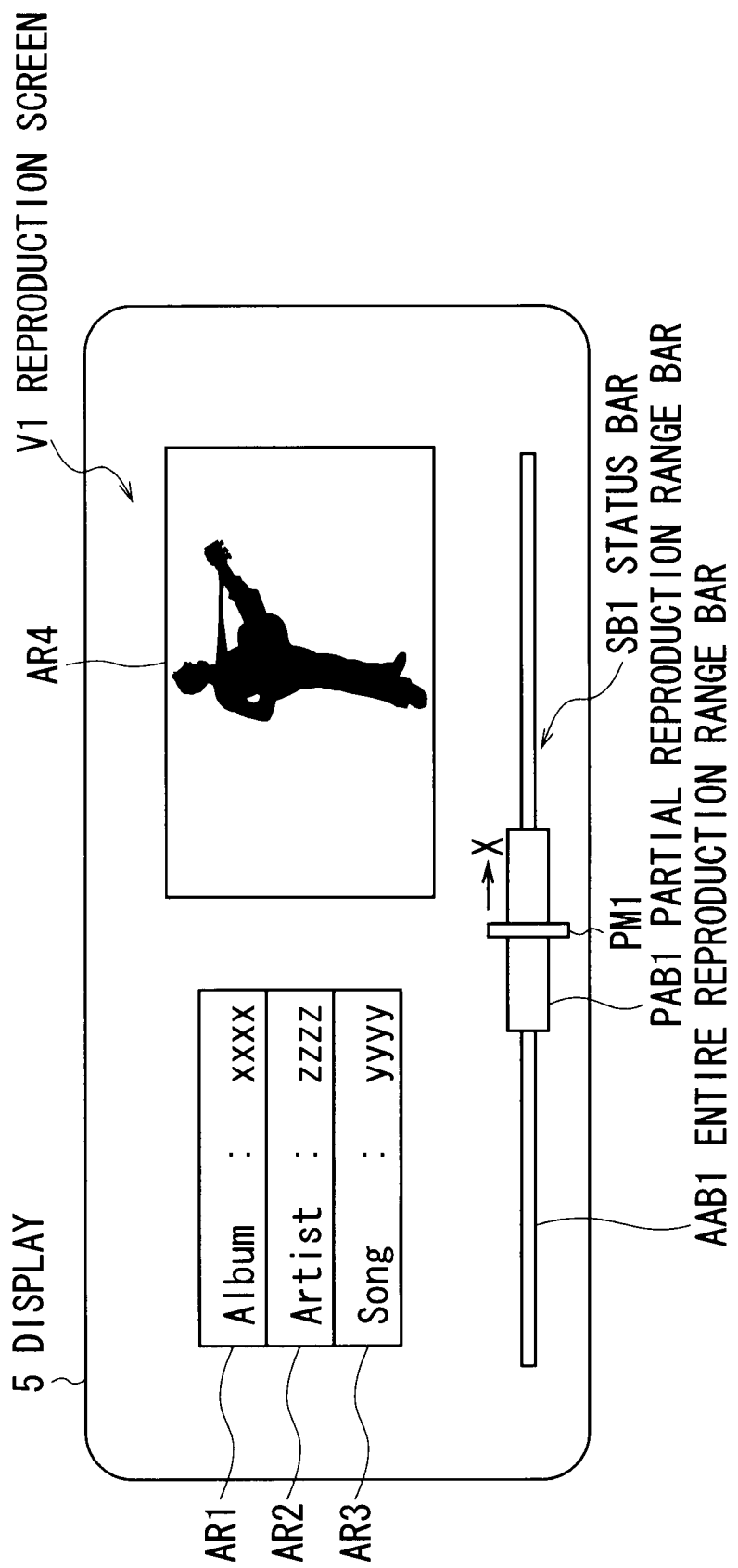
FIG. 5 is a schematic diagram showing the configuration of a reproduction screen.

Subsequently, as shown in FIG. 5, the controller 21 of the main unit 2 displays the album title ("xxxx") to which the music contents A pertains in an album name display field AR1 while partially reproducing the climax part data A1 of the music contents A, for example.

The controller 21 of the main unit 2 also displays an artist name ("zzzz") in an artist name display field AR2, displays the song title ("yyyy") of the music content A in a song name display field AR3, and displays a jacket photo corresponding to the music contents A in a photo display field AR4.

The vehicle audio apparatus 1 can thus make the user easily and intuitively recognize what song played by whom the music contents A are from the contents of the reproduction screen V1 including the album name display field AR1, the artist name display field AR2, the song name display field AR3, and the photo display field AR4 which are displayed on the display 5.

Note that the vehicle audio apparatus 1 can display the jacket photo corresponding to the music contents A in the photo display field AR4, aside from the album name display field AR1, the artist name display field AR2, and the song name display field AR3, so that the user can instantly remember from the photo image what the song of the music contents A is like.

In addition, the controller 21 of the main unit 2 displays the foregoing status bar SB1 as superimposed on a position below the song name display field AR3 and the photo display field AR4 of the reproduction screen V1, i.e., on the bottom position of the reproduction screen V1.

Here, the controller 21 of the main unit 2 displays the reproduction point mark PM1 of the partial reproduction range bar PAB1 on the status bar SB1 so as to move in the direction of the arrow X in conjunction with the elapsed reproduction time when partially reproducing the climax part data A1 of the music contents A.

Consequently, the vehicle audio apparatus 1 makes the user visually observe the position of the partial reproduction range bar PAB1 with respect to the entire reproduction range bar AAB1 of the status bar SB1 so that the user can instantly and intuitively recognize which part in the entire reproduction range of the music contents A the climax part data A1 (FIG. 4A) he/she is currently listening to falls on.

While the vehicle audio apparatus 1 displays the status bar SB1 by a default setting, the setting may be modified to hide the status bar SB1 and display the elapsed reproduction time in minutes and seconds instead.

(5) Functions of Status Bar

Description will now be given of various functions that can be implemented by the status bar SB1 which is superimposed and displayed on the reproduction screen V1 by the vehicle audio apparatus 1 according to the status bar display program.

How the user makes a touch operation on the vehicle audio apparatus 1 varies depending on whether the touch panel 5B (FIG. 2) of the display 5 is of single point detection type or multi point (two point, in this case) detection type. The functions of the status bar SB1 will thus be described for single point detection type and multi point detection type separately.

Figure 6A:
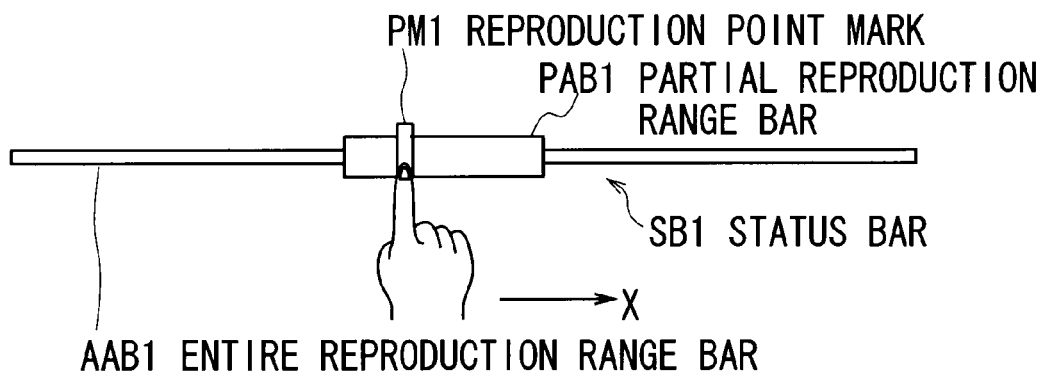
FIGS. 6A to 6C are schematic diagrams for explaining the function of changing a current reproduction point corresponding to touch panels of single point detection type and multi point detection type.

(5-1) Function of Changing Reproduction Point Corresponding to Touch Panels of Single Point Detection Type and Multi Point Detection Type As shown in FIG. 6A, with the status bar SB1 displayed by the controller 21 of the main unit 2, the vehicle audio apparatus 1 recognizes that the reproduction point mark PM1 of the status bar SB1 is touched with a user's fingertip and dragged in the direction of the arrow X. The vehicle audio apparatus 1 then proceeds to the next processing step.

Figure 6B:
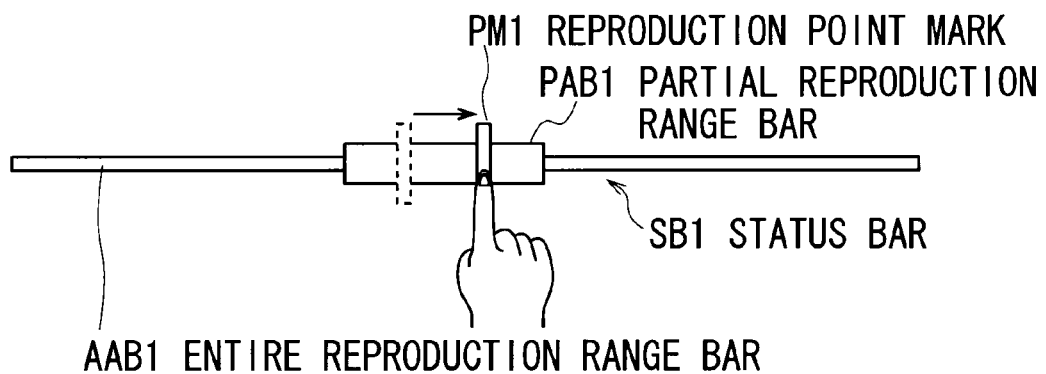

As shown in FIG. 6B, the controller 21 of the main unit 2 forcefully moves the reproduction point mark PM1 according to the user's drag operation and change the current reproduction point so as to correspond to the moved position, so that the result of reproduction at the changed current reproduction point can be output from the speaker 27.

In other words, the controller 21 of the main unit 2 at this time can output the result of reproduction of the future with respect to the reproduction point mark PM1 shown in FIG. 6A.

Now, if the controller 21 of the main unit 2 recognizes that the reproduction point mark PM1 of the statues bar SB1 is touched with a user's fingertip (FIG. 6A) and dragged in the direction opposite to that of the arrow X, the controller 21 of the main unit 2 proceeds to the next processing step.

Figure 6C:
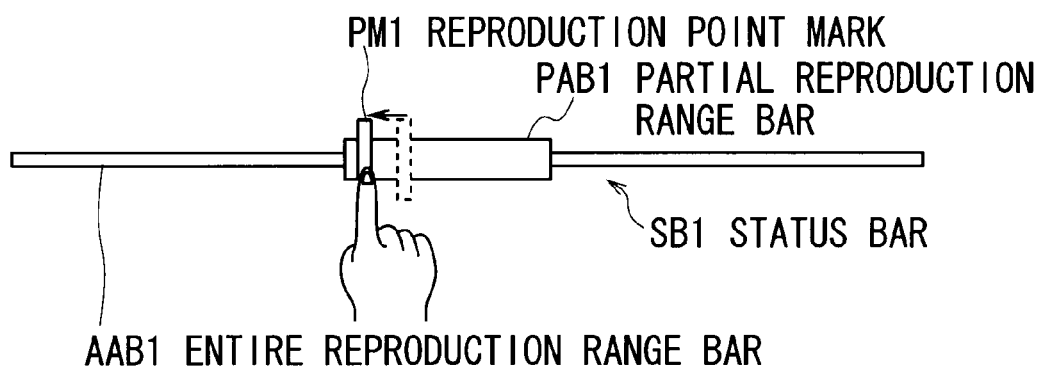

As shown in FIG. 6C, the controller 21 of the main unit 2 forcefully moves the reproduction point mark PM1 according to the user's drag operation and changes the current reproduction point so as to correspond to the moved position, so that the result of reproduction at the changed current reproduction point can be output from the speaker 27.

Here, the controller 21 of the main unit 2 can output the result of reproduction of the past again with respect to the reproduction point mark PM1 shown in FIG. 6A.

As described above, the controller 21 of the main unit 2 can move the reproduction point on the climax part data A1 of the music contents A to the past side or future side freely according to the drag operation on the reproduction point mark PM1 with a user's fingertip.

This makes it possible for the user to select the way to listen to the result of reproduction of the climax part data A1, like returns to the past side to repeat listening or forcefully advances to the future side to listen, by simply making an intuitive and sensory input of touching the reproduction point mark PM1 of the status bar SB1 and dragging it in the direction of the arrow X or in the opposite direction.

Note that since the vehicle audio apparatus 1 can implement the foregoing function of changing the reproduction point with only a touch and drag operation on a single point of the reproduction point mark PM1, the touch panel 5B may be of either of single point detection type and multi point detection type.

Figure 7A:
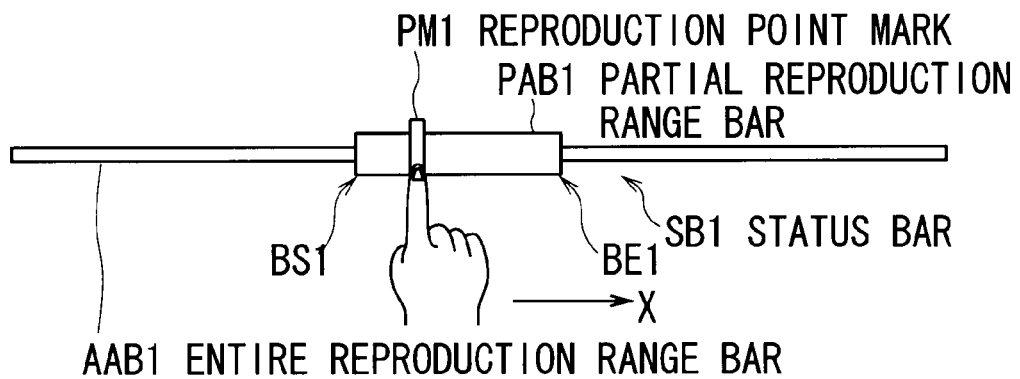
FIGS. 7A to 7E are schematic diagrams for explaining the function of moving the position of a partial reproduction range bar corresponding to the touch panel of single point detection type.
Figure 7B:
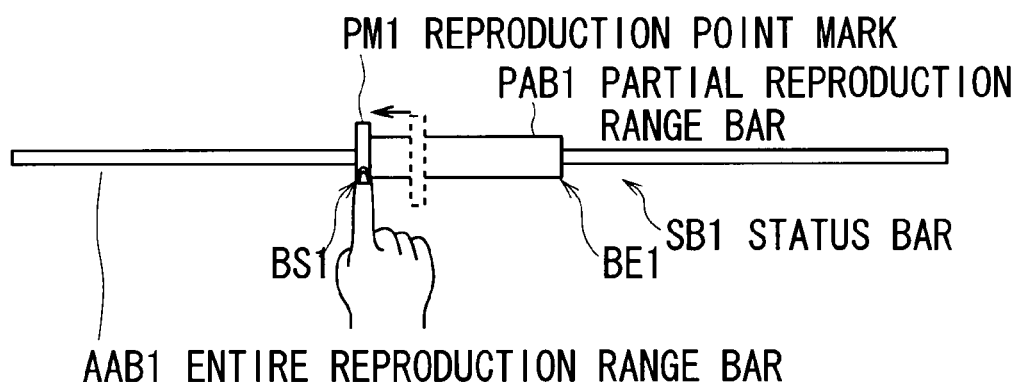

(5-2) Function of Moving Position of Partial Reproduction Range Bar Corresponding to Touch Panel of Single Point Detection Type If the vehicle audio apparatus 1 recognizes that the reproduction point mark PM1 of the status bar SB1 displayed by the controller 21 of the main unit 2 is touched with a user's fingertip as shown in FIG. 7A and then dragged in the direction opposite to that of the arrow X as shown in FIG. 7B, the vehicle audio apparatus 1 proceeds to the next processing step.

Here, the controller 21 of the main unit 2 moves the reproduction point mark PM1 up to the partial reproduction start point BS1 (partial reproduction start time) of the partial reproduction range bar PAB1 according to the user's drag operation. If the controller 21 recognizes that the reproduction point mark PM1 continues being touched and dragged further in the direction opposite to that of the arrow X beyond the partial reproduction start point BS1, the controller 21 proceeds to the next processing step.

Figure 7C:
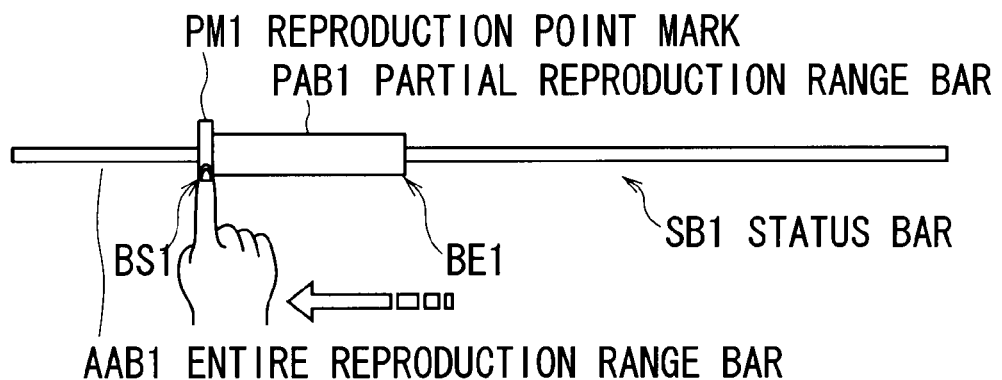

As shown in FIG. 7C, the controller 21 of the main unit 2 moves the partial reproduction range bar PAB1 in the direction opposite to that of the arrow X according to the foregoing drag operation, with the reproduction point mark PM1 and the partial reproduction range bar PAB1 integrated together, until the drag operation stops. The controller 21 thus finally determines the position of the partial reproduction range bar PAB1.

Figure 7D:
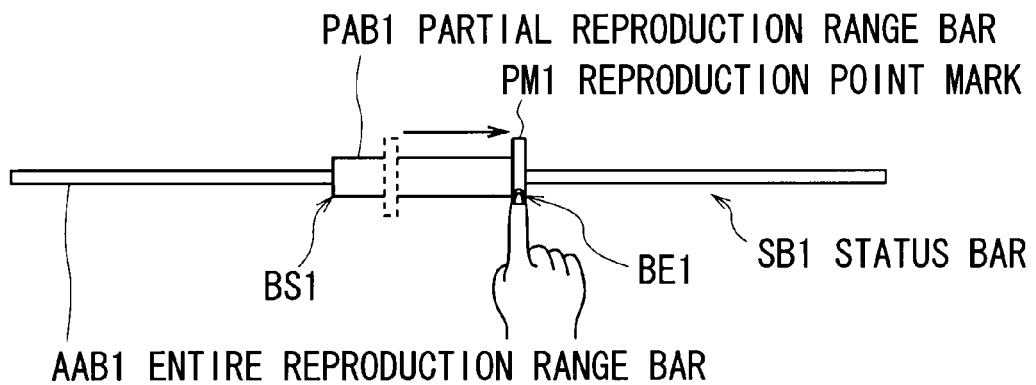

If the controller 21 of the main unit 2 recognizes that the reproduction point mark PM1 of the status bar SB1 is touched with a user's fingertip as shown in FIG. 7A and the reproduction point mark PM1 is then dragged in the direction of the arrow X as shown in FIG. 7D, the controller 21 proceeds to the next processing step.

Here, the controller 21 of the main unit 2 moves the reproduction point mark PM1 up to the partial reproduction end point BE1 (partial reproduction end time) of the partial reproduction range bar PAB1 according to the user's drag operation. If the controller 21 recognizes that the reproduction point mark PM1 continues being touched and dragged further in the direction of the arrow X beyond the partial reproduction end point BE1, the controller 21 proceeds to the next processing step.

Figure 7E:
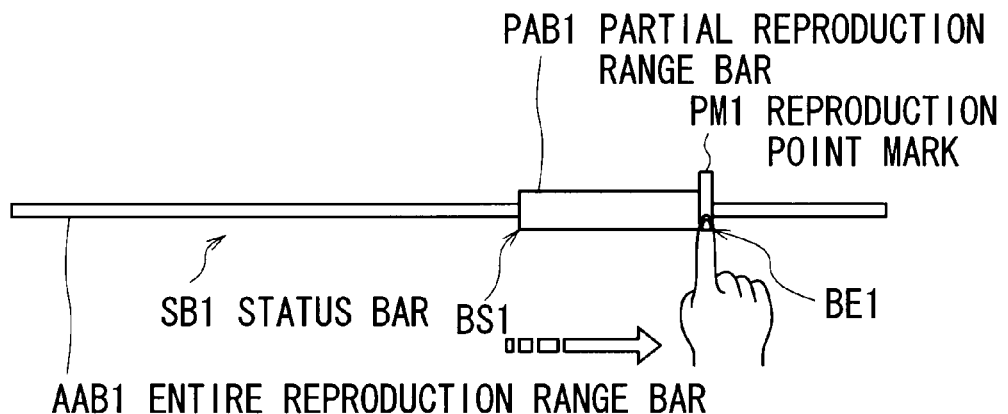

As shown in FIG. 7E, the controller 21 of the main unit 2 moves the partial reproduction range bar PAB1 in the direction of the arrow X according to the foregoing drag operation, with the reproduction point mark PM1 and the partial reproduction range bar PAB1 integrated together, until the drag operation stops. The controller 21 thus finally determines the position of the partial reproduction range bar PAB1.

As described above, with the touch panel 5B of single point detection type, the vehicle audio apparatus 1 can move the position of the partial reproduction range bar PAB1 with respect to the entire reproduction range bar AAB1 according to a drag operation on the reproduction point mark PM1 of the partial reproduction range bar PAB1 in the direction of the arrow X or in the opposite direction.

Figure 8A:
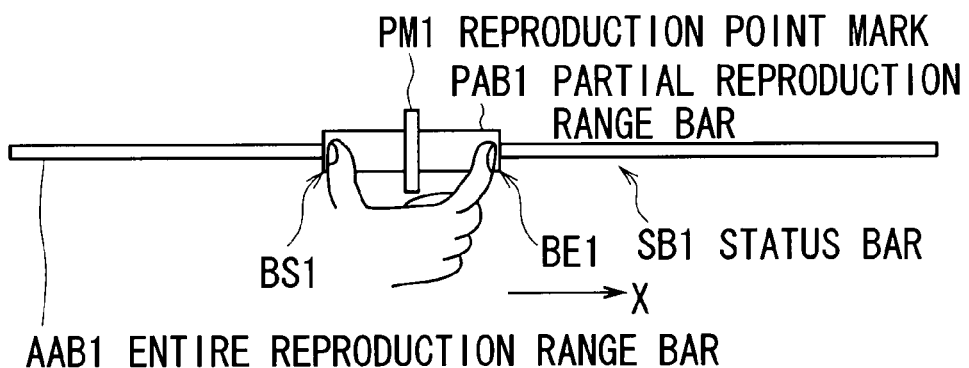
FIGS. 8A to 8C are schematic diagrams for explaining the function of moving the position of a partial reproduction range bar corresponding to a touch panel of two point detection type.

(5-3) Function of Moving Position of Partial Reproduction Range Bar Corresponding to Touch Panel of Multi Point Detection Type As shown in FIG. 8A, if the vehicle audio apparatus 1 recognizes that two points on both sides of the partial reproduction range bar PAB1 of the status bar SB1 displayed by the controller 21 of the main unit 2 are touched with user's fingertips, the vehicle audio apparatus 1 proceeds to the next processing step.

Figure 8B:
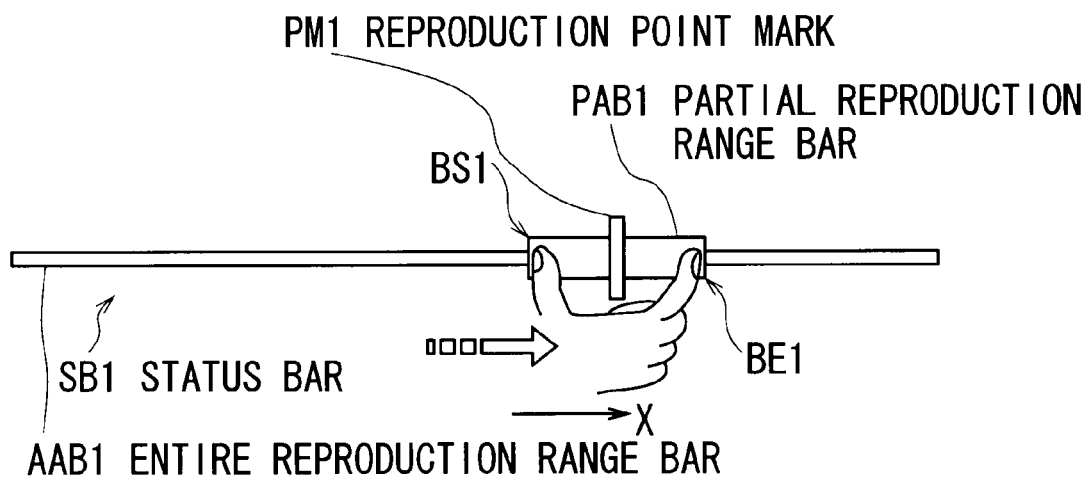

As shown in FIG. 8B, if the controller 21 of the main unit 2 recognizes that the two points on both sides of the partial reproduction range bar PAB1, touched with the user's fingertips, are dragged in the direction of the arrow X, the controller 21 moves the whole of the partial reproduction range bar PAB1 accordingly in the direction of the arrow X for display.

When the controller 21 of the main unit 2 subsequently recognizes the end of the drag operation, the controller 21 then stops moving the partial reproduction range bar PAB1 in the direction of the arrow X to finally determine the position of the partial reproduction range bar PAB1.

Figure 8C:
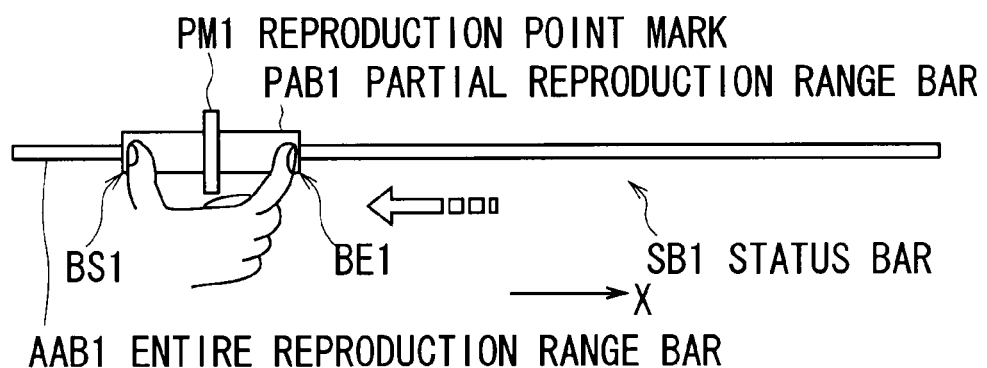

Now, as shown in FIG. 8C, if the controller 21 of the main unit 2 recognizes that the two points on both sides of the partial reproduction range bar PAB1, touched with the user's fingertips as shown in FIG. 8A, are dragged in the direction opposite to that of the arrow X, the controller 21 moves the whole of the partial reproduction range bar PAB1 accordingly in the direction opposite to that of the arrow X for display.

When the controller 21 of the main unit 2 subsequently recognizes the end of the drag operation, the controller 21 then stops moving the partial reproduction range bar PAB1 in the direction opposite to that of the arrow X to finally determine the position of the partial reproduction range bar PAB1.

Incidentally, the controller 21 of the main unit 2 can move and display the partial reproduction range bar PAB1 not only when the two points on both sides of the partial reproduction range bar PAB1 of the status bar SB1 are touched with user's fingertips, but when any two points of the partial reproduction range bar PAB1 are touched and dragged as well.

As described above, with the touch panel 5B of two point detection type, the vehicle audio apparatus 1 can move the position of the partial reproduction range bar PAB1 with respect to the entire reproduction range bar AAB1 according to a drag operation in the direction of the arrow X or in the opposite direction with two points on both sides of the partial reproduction range bar PAB1 touched with user's fingertips.

Figure 9A:
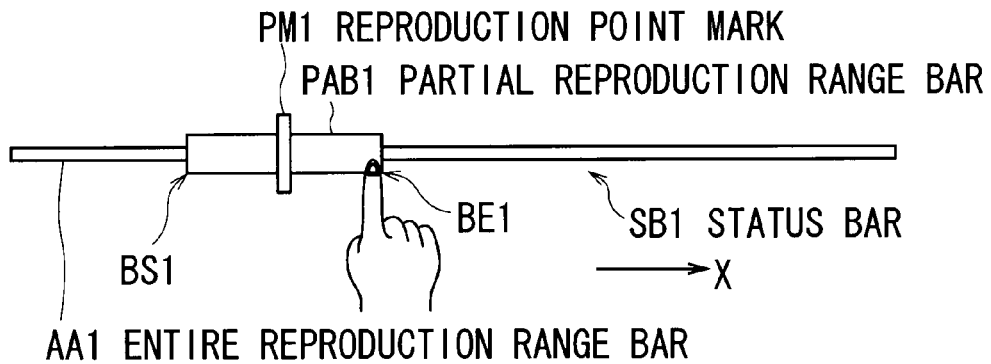
FIGS. 9A to 9F are schematic diagrams for explaining the function of changing the reproduction range of the partial reproduction range bar corresponding to the touch panel of single point detection type.
Figure 9B:
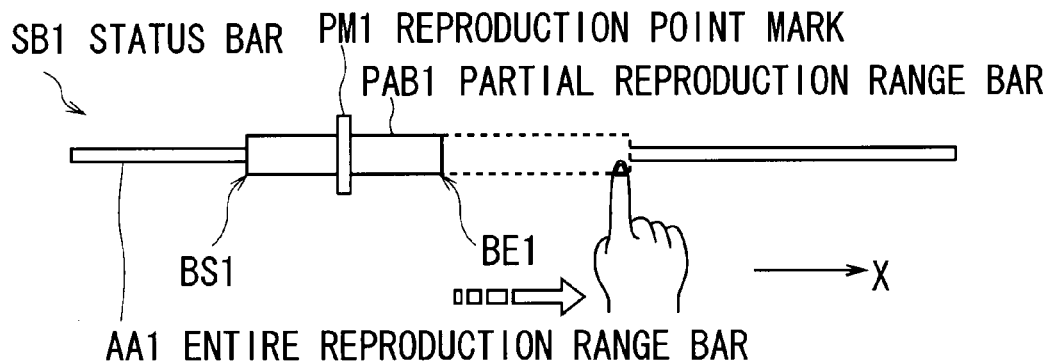

(5-4) Function of Changing Reproduction Range of Partial Reproduction range Bar Corresponding to Touch Panel of Single Point Detection Type As shown in FIG. 9A, if the vehicle audio apparatus 1 recognizes that an end area of the partial reproduction range bar PAB1 of the status SB1 displayed by the controller 21 of the main unit 2, such as the one including the partial reproduction end point BE1, is touched with a user's fingertip and then dragged in the direction of the arrow X as shown in FIG. 9B, the vehicle audio apparatus 1 proceeds to the next processing step.

Here, the controller 21 of the main unit 2 stretches the partial reproduction range bar PAB1 as if the partial reproduction end point BE1 of the partial reproduction range bar PAB1 moves in the direction of the arrow X according to the user's drag operation, thereby expanding the partial reproduction range of the partial reproduction range bar PAB1 to the future side.

Figure 9C:
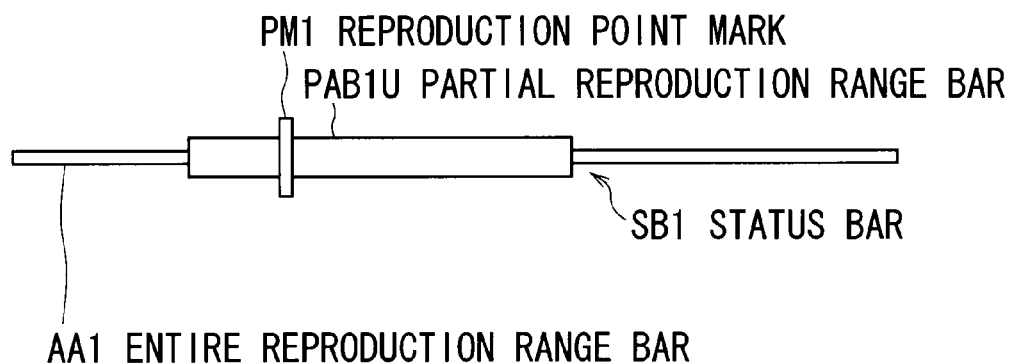

As shown in FIG. 9C, when the controller 21 of the main unit 2 recognizes that the user's drag operation stops, the controller 21 stretches the partial reproduction range bar PAB1 so that the partial reproduction end point BE1 moves to the stopped position, and displays the resultant as a new partial reproduction range bar PAB1U with the partial reproduction range expanded to the future side.

If the controller 21 of the main unit 2 recognizes that the end area including the partial reproduction end point BE1 is touched with a user's fingertip and then dragged in the direction opposite to that of the arrow X, the controller 21 can contract the partial reproduction range bar PAB1 so that the partial reproduction end point BE1 of the partial reproduction range bar PAB1 moves in the direction opposite to that of the arrow X, thereby reducing the partial reproduction range.

Figure 9D:
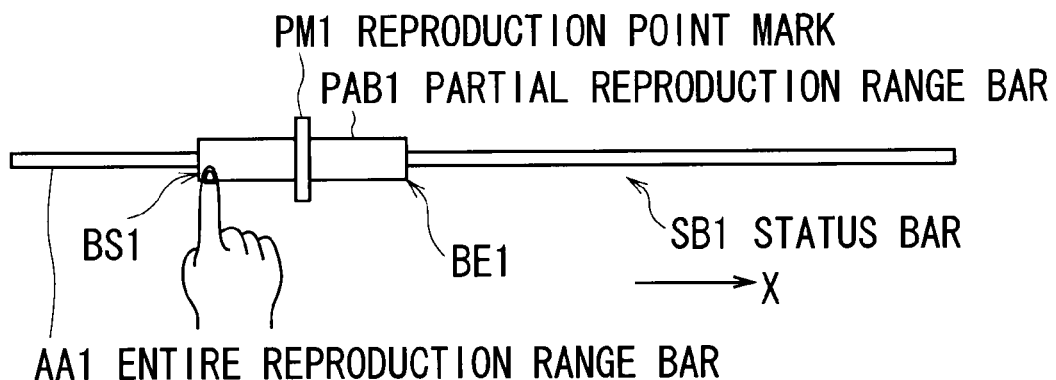
Figure 9E:
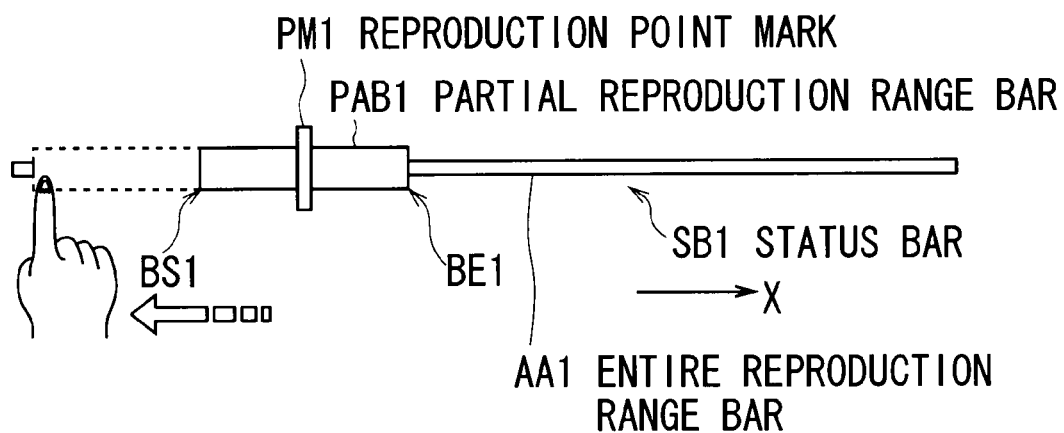

Now, as shown in FIG. 9D, if the vehicle audio apparatus 1 recognizes that an end area of the partial reproduction range bar PAB1 of the status SB1 displayed by the controller 21 of the main unit 2, such as the one including the partial reproduction start point BS1, is touched with a user's fingertip and then dragged in the direction opposite to that of the arrow X as shown in FIG. 9E, the vehicle audio apparatus 1 proceeds to the next processing step.

Here, the controller 21 of the main unit 2 stretches the partial reproduction range bar PAB1 so that the partial reproduction start point BS1 of the partial reproduction range bar PAB1 moves in the direction opposite to that of the arrow X according to the user's drag operation, thereby expanding the partial reproduction range of the partial reproduction range bar PAB1 to the past side.

Figure 9F:
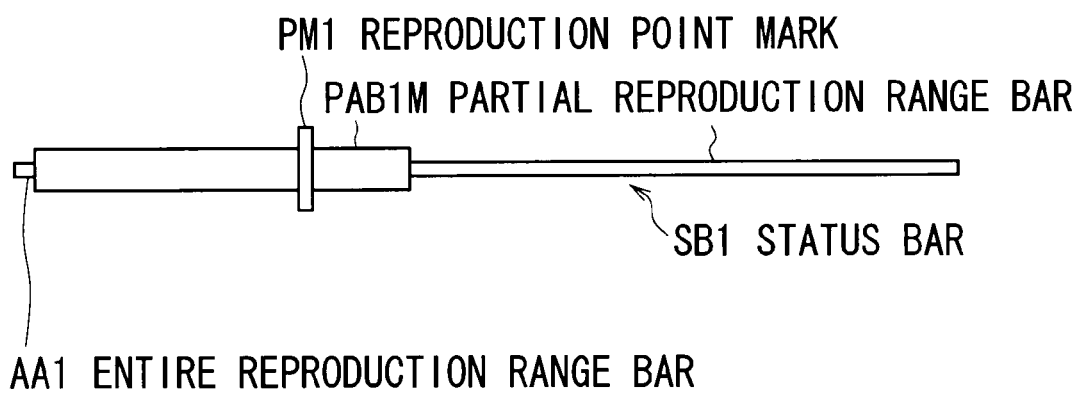

As shown in FIG. 9F, when the controller 21 of the main unit 2 recognizes that the user's drag operation stops, the controller 21 stretches the partial reproduction range bar PAB1 so that the partial reproduction start point BS1 moves to the stopped position, and displays the resultant as a new partial reproduction range bar PAB1M with the partial reproduction range expanded to the past side.

Again, if the controller 21 of the main unit 2 recognizes that the end area including the partial reproduction start point BS1 is touched with a user's fingertip and then dragged in the direction of the arrow X, the controller 21 can contract the partial reproduction range bar PAB1 so that the partial reproduction start point BS1 of the partial reproduction range bar PAB1 moves in the direction of the arrow X, thereby reducing the partial reproduction range.

As described above, with the touch panel 5B of single point detection type, the vehicle audio apparatus 1 can change the range of the partial reproduction range bar PAB1 freely according to a drag operation in the direction of the arrow X or in the opposite direction with the end area of the partial reproduction range bar PAB1 including the partial reproduction start point BS1 or the end area including the partial reproduction end point BE1 touched with a user's fingertip.

Figure 10A:
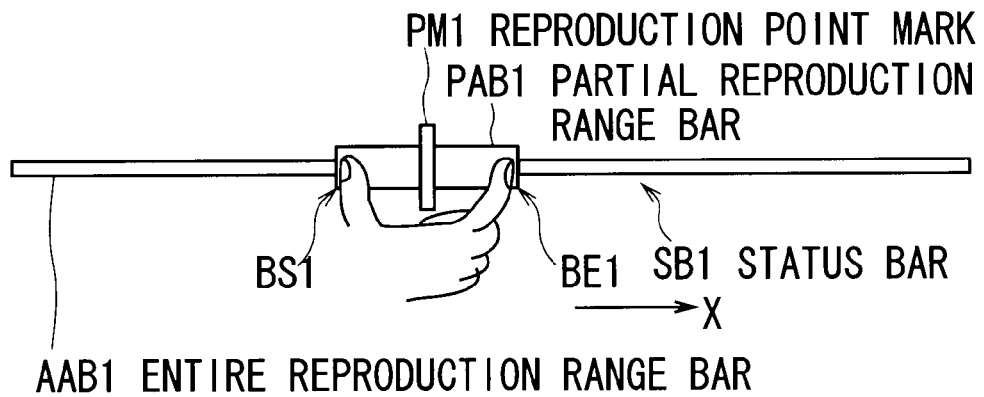
FIGS. 10A to 10C are schematic diagrams for explaining the function of changing the reproduction range of the partial reproduction range bar corresponding to the touch panel of two point detection type.
Figure 10B:
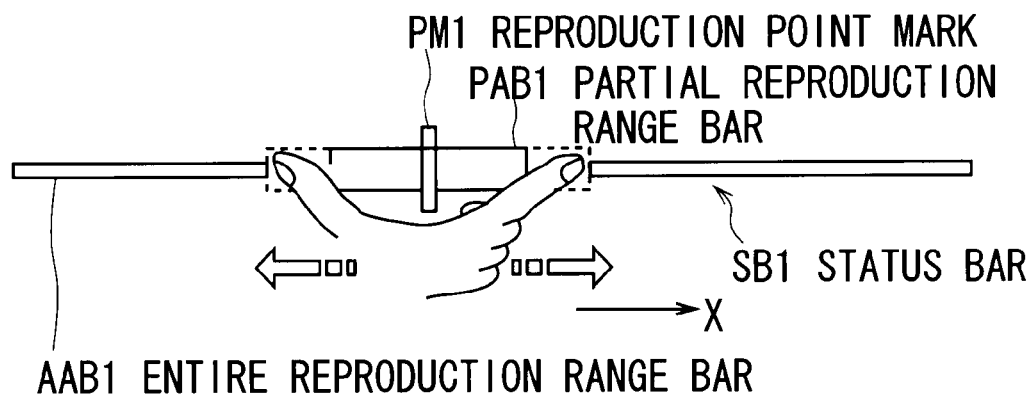

(5-5) Function of Changing Reproduction Range of Partial Reproduction Range Bar Corresponding to Touch Panel of Multi Point Detection Type As shown in FIG. 10A, if the vehicle audio apparatus 1 recognizes that the end area including the partial reproduction start point BS1 and the end area including the partial reproduction end point BE1 of the partial reproduction range bar PAB1 of the status SB1 displayed by the controller 21 of the main unit 2 are both touched with user's fingertips (thumb and index finger) and then dragged in the direction of the arrow X and in the opposite direction simultaneously as shown in FIG. 10B, the vehicle audio apparatus 1 proceeds to the next processing step.

Here, the controller 21 of the main unit 2 stretches the partial reproduction range bar PAB1 to the past side and future side so that the partial reproduction start point BS1 of the partial reproduction range bar PAB1 moves in the direction opposite to that of the arrow X and the partial reproduction end point BE1 of the partial reproduction range bar PAB1 moves in the direction of the arrow X according to the user's drag operations on the two positions. The controller 21 thereby expands the partial reproduction range of the partial reproduction range bar PAB1.

Figure 10C:
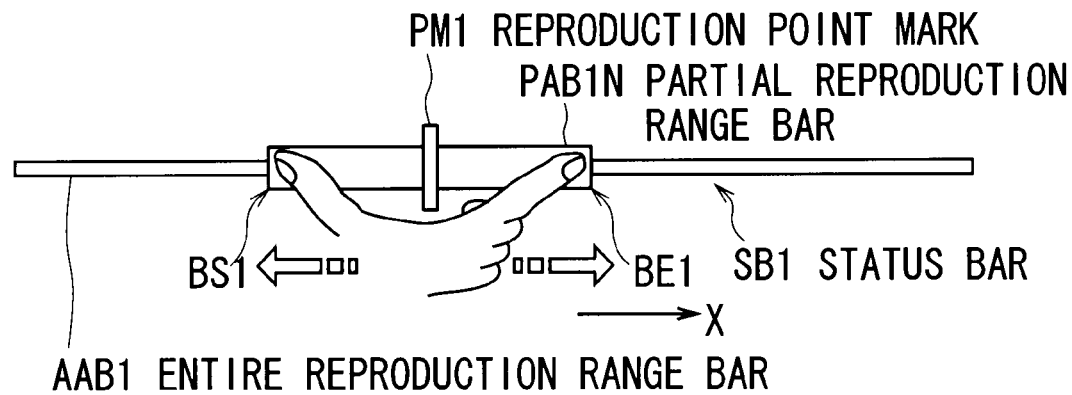

As shown in FIG. 10C, when the controller 21 of the main unit 2 recognizes that the user's drag operations on the two positions stop, the controller 21 stretches the partial reproduction range bar PAB1 so that the partial reproduction start point BS1 and the partial reproduction end point BE1 move to the stopped positions, and displays the resultant as a new partial reproduction range bar PAB1N with the partial reproduction range expanded to the past side and future side.

If the controller 21 of the main unit 2 recognizes that the end area including the partial reproduction start point BS1 and the end area including the partial reproduction end point BE1 are touched with user's fingertips (thumb and index finger) and then dragged in the directions where the distance between the fingertips decreases, the controller 21 can contract the partial reproduction range bar PAB1 so that the partial reproduction start point BS1 of the partial reproduction range bar PAB1 moves in the direction of the arrow X and the partial reproduction end point BE1 moves in the direction opposite to that of the arrow X, thereby reducing the partial reproduction range.

As described above, with the touch panel 5B of two point detection type, the vehicle audio apparatus 1 can expand or reduce the range of the partial reproduction range bar PAB1 freely according to drag operations in the direction of the arrow X and in the opposite direction with the end area of the partial reproduction range bar PAB1 including the partial reproduction start point BS1 and the end area including the partial reproduction end point BE1 touched with user's fingertips (thumb and index finger).

(6) Operation and Effect

With the foregoing configuration, the vehicle audio apparatus 1 displays the reproduction screen V1 pertaining to the music contents A on the display 5, and displays the status bar SB1 as superimposed on a predetermined position of the reproduction screen V1. The vehicle audio apparatus 1 thereby allows the user to visually observe the position of the partial reproduction range bar PAB1 with respect to the status bar SB1 while outputting the result of partial reproduction of the climax part data A1 from the speaker 27.

Consequently, the vehicle audio apparatus 1 allows the user to visually observe the position of the partial reproduction range bar PAB1 with respect to the entire reproduction range bar AAB1 of the music contents A as a visual image, unlike when the elapsed reproduction time of the climax part data A1 is displayed in minutes and seconds on the reproduction screen V1 of the music contents A.

As a result, the user can instantly and intuitively recognize which part in the entire reproduction range AA1 of the music contents A the partial reproduction range PA1 of the climax part data A1 being partially reproduced by the vehicle audio apparatus 1 falls on, from the position of the partial reproduction range bar PAB1 with respect to the entire reproduction range bar AAB1 of the status bar SB1.

The vehicle audio apparatus 1 is thus particularly effective in environments where the user, i.e., a driver who is driving the vehicle is not able to keep his/her eyes on the reproduction screen V1 of the display 5 for a long time, as compared to the case where the elapsed reproduction time of the climax part data A1 is displayed in minutes and seconds.

The vehicle audio apparatus 1 displays the reproduction point mark PM1 on the partial reproduction range bar PA1 of the status bar SB1 as moved with the progress of the partial reproduction processing, so that the user can instantly and intuitively recognize which part of the partial reproduction range PA1 the user is currently listening to.

The vehicle audio apparatus 1 can move the reproduction point mark PM1 on the partial reproduction range bar PAB1 of the status bar SB1 in accordance with user's drag operations, so that the user can change the current reproduction point freely during the partial reproduction processing.

As shown in FIGS. 7A to 7E and FIGS. 8A to 8C, the vehicle audio apparatus 1 can freely move the position of partial reproduction range bar PAB1 with respect to the entire reproduction range bar AAB1 by a touch and drag operation with a user's fingertip or fingertips. This makes it possible to change the target of the partial reproduction processing to any part other than the climax part, such as an introduction part, end part, and vocal start part of the song.

Consequently, the vehicle audio apparatus 1 can increase the variations of the listening point to be subjected to the partial reproduction processing. Besides, the vehicle audio apparatus 1 can not only perform the partial reproduction processing on climax parts alone successively, but also switch between climax parts, introduction parts, end parts, and vocal start parts arbitrarily for the partial reproduction processing, with a significant improvement in terms of entertainment.

As shown in FIGS. 9A to 9F and FIGS. 10A to 10C, the vehicle audio apparatus 1 can freely change the range of the partial reproduction range bar PAB1 with respect to the entire reproduction range bar AAB1 by a touch and drag operation with a user's fingertip or fingertips. This makes it possible to change the target of the partial reproduction processing to a wider range that covers up to the preceding introduction part in addition to the climax part.

Similarly, the vehicle audio apparatus 1 may change the target of the partial reproduction processing to a wide range that covers up to the end part in addition to the climax part, or may change the target of the partial reproduction processing to the entire reproduction range AA1 of the music contents A from the introduction part to the end part.

Since the vehicle audio apparatus 1 can thus change the target of the partial reproduction processing freely, it is possible to increase and decrease the duration of the partial reproduction processing freely without the target of the partial reproduction processing being limited to the duration of the climax part.

According to the foregoing configuration, the vehicle audio apparatus 1 allows instant and intuitive recognition of making it possible to instantly and intuitively recognize the position of the partial reproduction processing through the entire reproduction range bar AAB1 and the partial reproduction range bar PAB1 of the status bar SB1.

The vehicle audio apparatus 1 can change the current reproduction point of the reproduction point mark PM1, move the position of the partial reproduction range bar PAB1, and change the reproduction range of the partial reproduction range bar PAB1 by only an intuitive touch and drag operation with a user's fingertip or fingertips. The vehicle audio apparatus 1 can thus handle rough requests such as "play somewhere this part for about this long," instead of having the user enter quantitative setting values.

(7) Other Embodiments

The foregoing embodiment has dealt with the case where the partial reproduction range bar PAB1 is thicker than the entire reproduction range bar AAB1. The present invention is not limited thereto, however, and the entire reproduction range bar AAB1 may be thicker than the partial reproduction range bar PAB1.

The foregoing embodiment has also dealt with the case where the music contents A to C are used as the reproduction targets. The present invention is not limited thereto, however, and the reproduction targets may be visual contents. In that case, climax scenes which correspond to climax parts may be used as the targets of the partial reproduction processing so that the results of the partial reproduction processing, or partial reproduced images, are displayed on the reproduction screen V1 in order.

The foregoing embodiment has also dealt with the case where the vehicle audio apparatus 1 performs the partial reproduction processing on the plurality of pieces of music contents A to C that are stored in the hard disc in the hard disc drive 28.

However, the present invention is not limited thereto. The vehicle audio apparatus 1 may perform the partial reproduction processing on music contents or video contents that are reproduced from a CD medium or DVD medium on the disc player 24. Video contents stored in the hard disc may also be included in the partial reproduction processing.

The foregoing embodiment has dealt with the case where the reproduction point mark PM1 is displayed on the partial reproduction range bar PAB1. The present invention is not limited thereto, however, and the reproduction point mark PM1 may be hidden depending on user settings.

The foregoing embodiment has also dealt with the case where the partial reproduction range bar PAB1 is moved according to a drag operation on the reproduction point mark PM1 as shown in FIGS. 7A to 7E.

However, the present invention is not limited thereto. The vehicle audio apparatus 1 may move the partial reproduction range bar PAB1 in the direction of the arrow X or in the opposite direction according to a fingertip's touch and drag operation on the end area including the partial reproduction start point BS1 or the end area including the partial reproduction end point BE1 of the partial reproduction range bar PAB1.

The foregoing embodiment has also dealt with the case where the foregoing status bar SB1 and the like are created and displayed to implement various functions of the status bar SB1 according to the status bar display program which is a preinstalled application program.

However, the present invention is not limited thereto. The vehicle audio apparatus 1 may create the foregoing status bar SB1 and implement the foregoing various functions according to a status bar display program that is installed from a predetermined recording medium, a status bar display program that is downloaded over the Internet, or a status bar display program that is installed through various other routes.

The foregoing embodiment has also dealt with the case where the vehicle audio apparatus as a content reproduction apparatus is composed of: the disc player 24, the hard disc drive 28, and the controller 21 as a partial reproduction unit; the controller 21 as a status bar creation unit; the display 5 as a display unit; and the controller 21 as a control unit.

However, the present invention is not limited thereto. The content reproduction apparatus may include a partial reproduction unit, status bar creation unit, display unit, and control unit of various other circuit configurations.

While the content reproduction apparatus, the status bar display method, and the status bar display program according to the embodiment of the present invention have been applied to the vehicle audio apparatus, they are also applicable to various other types of electronic apparatuses such as a home audio apparatus in a home audio system, a personal computer, a cellular phone, and a game console.

The present application contains subject matter related to that disclosed in Japanese Priority Patent Application JP 2008-124953 filed in the Japan Patent Office on May 12, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A content reproduction apparatus comprising:
   means for extracting a partial reproduction range from each of plural pieces of content;
   means for sequentially reproducing the extracted partial reproduction ranges of all of the plural pieces of content;
   means for creating a status bar by superimposing a partial reproduction range bar indicating the partial reproduction range on an entire reproduction range bar indicating an entire reproduction range so that a reproduction point mark indicating a current reproduction point under the partial reproduction is superimposed on the partial reproduction range bar;
   means for displaying a reproduction screen has a touch panel which allows a touch operation on the status bar when the sequential reproduction is performed by the means for sequentially reproducing; and
   means for displaying the status bar as superimposed on the reproduction screen wherein when the means for displaying the status bar detects from the touch panel that the reproduction point mark is being moved beyond the range of the partial reproduction range bar by a touch operation, the means for displaying the status bar moves the position of the partial reproduction range bar with respect to the entire reproduction range bar, wherein
   the means for sequentially reproducing reproduce a climax switching sound effect between the sequentially reproduced extracted partial reproduction ranges, each extracted partial reproduction range being reproduced in its entirety.

2. The content reproduction apparatus according to claim 1, wherein
   when the means for displaying the status bar detects from the touch panel that the reproduction point mark is moved by a touch operation, the control means changes the current reproduction point according to a moved position of the reproduction point mark.

3. The content reproduction apparatus according to claim 1, wherein
   when the means for displaying the status bar detects from the touch panel that an end of the partial reproduction range bar is touched and dragged, the means for displaying the status bar stretches or contracts the partial reproduction range bar on the entire reproduction range bar.

4. A status bar display method comprising: extracting a partial reproduction range from each of plural pieces of content;
   sequentially reproducing the extracted partial reproduction ranges of all of the plural pieces of content;
   creating a status bar by superimposing a partial reproduction range bar indicating the partial reproduction range on an entire reproduction range bar indicating an entire reproduction range by a predetermined status bar creation unit so that a reproduction point mark indicating a current reproduction point under the partial reproduction is superimposed on the partial reproduction range bar;
   displaying a reproduction screen on a predetermined display unit comprising a touch panel which allows a touch operation on the status bar when the sequential reproduction is performed; and
   displaying the status bar as superimposed on the reproduction screen by a predetermined control unit, in the displaying the status bar, when it is detected from the touch panel that the reproduction point mark is being moved beyond the range of the partial reproduction range bar by a touch operation, the position of the partial reproduction range bar is moved with respect to the entire reproduction range bar wherein
   the sequentially reproducing includes reproducing a climax switching sound effect between the sequentially reproduced partial reproduction ranges, each extracted partial reproduction range being reproduced in its entirety.

5. The status bar display method according to claim 4, wherein
   in the displaying the status bar, when it is detected from the touch panel that the reproduction point mark is moved by a touch operation, the current reproduction point is changed according to a moved position of the reproduction point mark.

6. The status bar display method according to claim 4, wherein
in the displaying the status bar, when it is detected from the touch panel that an end of the partial reproduction range bar is touched and dragged, the partial reproduction range bar is stretched or contracted on the entire reproduction range bar.

7. A content reproduction apparatus comprising:
an extraction unit configured to extract a partial reproduction range from each of plural pieces of content;
a partial reproduction unit configured to sequentially reproduce the extracted partial reproduction ranges of all of the plural pieces of content;
a creation unit configured to create a status bar by superimposing a partial reproduction range bar indicating the partial reproduction range on an entire reproduction range bar indicating an entire reproduction range so that a reproduction point mark indicating a current reproduction point under the partial reproduction is superimposed on the partial reproduction range bar;
a display unit configured to display a reproduction screen comprising a touch panel which allows a touch operation on the status bar when the partial reproduction is performed by the partial reproduction unit; and
a control unit configured to display the status bar as superimposed on the reproduction screen and wherein when it is detected from the touch panel that the reproduction point mark is being moved beyond the range of the partial reproduction range bar by a touch operation, the position of the partial reproduction range bar is moved with respect to the entire reproduction range bar, wherein
the partial reproduction unit reproduces a climax switching sound effect between the sequentially reproduced extracted partial reproduction ranges, each extracted partial reproduction range being reproduced in its entirety.

8. The content reproduction apparatus according to claim 1, wherein the means for displaying the status bar detects that two endpoints of the partial reproduction range bar are simultaneously touched and dragged along the entire reproduction range bar and moves a position of the partial reproduction range bar with respect to the entire reproduction range bar in accordance with the detection.

9. The status bar display method according to claim 4, wherein the displaying the status bar includes detecting that two endpoints of the partial reproduction range bar are simultaneously touched and dragged along the entire reproduction range bar and moving a position of the partial reproduction range bar with respect to the entire reproduction range bar in accordance with the detection.

10. The content reproduction apparatus according to claim 7, wherein the control unit detects that two endpoints of the partial reproduction range bar are simultaneously touched and dragged along the entire reproduction range bar and moves a position of the partial reproduction range bar with respect to the entire reproduction range bar in accordance with the detection.

* * * * *